US008077367B2

(12) United States Patent
Gollier

(10) Patent No.: US 8,077,367 B2
(45) Date of Patent: Dec. 13, 2011

(54) SPECKLE MITIGATION IN LASER PROJECTION SYSTEMS

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 469 days.

(21) Appl. No.: 12/431,965

(22) Filed: Apr. 29, 2009

(65) Prior Publication Data

US 2010/0277704 A1    Nov. 4, 2010

(51) Int. Cl.
*G02B 26/08* (2006.01)

(52) U.S. Cl. .................................................. 359/201.1

(58) Field of Classification Search ............... 359/201.1, 359/201.2, 212.1–214.1, 223.1–226.1, 298
See application file for complete search history.

(56) References Cited

U.S. PATENT DOCUMENTS

| 5,307,207 | A | 4/1994 | Ichihara | 359/622 |
|---|---|---|---|---|
| 5,313,479 | A | 5/1994 | Florence | 372/26 |
| 5,621,529 | A | 4/1997 | Gordon et al. | 356/376 |
| 5,729,374 | A | 3/1998 | Tiszauer et al. | 359/212 |
| 6,081,381 | A | 6/2000 | Shalapenok et al. | 359/619 |
| 6,154,259 | A | 11/2000 | Hargis et al. | 348/756 |
| 6,317,169 | B1 | 11/2001 | Smith | 348/744 |
| 6,323,984 | B1 | 11/2001 | Trisnadi | 359/245 |
| 6,367,935 | B1 | 4/2002 | Wang et al. | 353/122 |
| H2045 | H | 9/2002 | Busse et al. | 385/31 |
| 6,445,487 | B1 | 9/2002 | Roddy et al. | 359/278 |
| 6,594,090 | B2 | 7/2003 | Kruschwitz et al. | 359/707 |
| 6,600,590 | B2 | 7/2003 | Roddy et al. | 359/287 |
| 6,738,105 | B1 | 5/2004 | Hannah et al. | 348/745 |
| 6,747,781 | B2 | 6/2004 | Trisnadi | 359/279 |
| 6,863,216 | B2 | 3/2005 | Tsikos et al. | 235/462.01 |
| 6,870,650 | B2 | 3/2005 | Kappel et al. | 359/15 |
| 6,874,893 | B2 | 4/2005 | Park | 353/84 |
| 6,910,774 | B2 | 6/2005 | Troyer | 353/31 |
| 6,952,435 | B2 | 10/2005 | Lai et al. | 372/9 |
| 7,046,446 | B1 | 5/2006 | Kowarz et al. | 359/618 |
| 7,116,017 | B2 | 10/2006 | Ji et al. | 310/23 |

(Continued)

FOREIGN PATENT DOCUMENTS

EP    2037312    3/2009

(Continued)

OTHER PUBLICATIONS

Wang et al; "Speckle reduction in laser projections with ultrasonic waves"; Opt. Eng. 39(6) 1659-1664 (Jun. 2000); 2000 Society of Photo-Optical Instrumentation Engineers.

(Continued)

*Primary Examiner* — Euncha Cherry
(74) *Attorney, Agent, or Firm* — Svetlana Z. Short

(57) ABSTRACT

Particular embodiments relate generally to laser projection systems and, more particularly, to systems and methods of reducing the appearance of speckle in laser projection images. According to one embodiment, a laser projection system comprising a light source and scanning optics is provided. The scanning optics include a plurality of frame generating optics configured to scan the output beam across a given projection surface to generate an image frame. The frame generating actuators are spatially separated such that output beams scanned by the frame generating actuators illuminate each common pixel portion of the image frames at a different incidence angle. The scanning optics also include an actuator selector positioned in an optical path of the output beam and configured to direct the output beam towards a selected one of the plurality of frame generating actuators.

20 Claims, 4 Drawing Sheets

U.S. PATENT DOCUMENTS

| | | |
|---|---|---|
| 7,119,936 B2 | 10/2006 | Kowarz et al. ............. 359/224 |
| 2006/0001780 A1 | 1/2006 | Ahn et al. ................. 348/744 |
| 2006/0028961 A1 | 2/2006 | Kim et al. ............. 369/112.01 |
| 2006/0109553 A1 | 5/2006 | Serafimovich et al. ...... 359/565 |
| 2006/0126155 A1* | 6/2006 | Kowarz et al. ............. 359/298 |
| 2006/0126184 A1 | 6/2006 | Kim et al. ................. 359/599 |
| 2006/0238743 A1 | 10/2006 | Lizotte et al. ............ 356/28.5 |
| 2006/0250532 A1 | 11/2006 | Shin ........................... 349/6 |
| 2007/0047059 A1 | 3/2007 | Howard et al. ............. 359/277 |
| 2007/0153235 A1 | 7/2007 | Morikawa et al. ............ 353/20 |
| 2007/0170365 A1* | 7/2007 | Williams et al. ......... 250/370.08 |
| 2007/0296645 A1 | 12/2007 | Lee et al. ..................... 345/6 |
| 2008/0137163 A1 | 6/2008 | Prudnikov .................. 359/203 |

FOREIGN PATENT DOCUMENTS

| | | |
|---|---|---|
| WO | 97/02507 | 1/1997 |
| WO | 2005/041423 | 5/2005 |
| WO | 2005/062114 | 7/2005 |
| WO | 2005/083492 | 9/2005 |
| WO | 2005/098532 | 10/2005 |
| WO | 2006/024998 | 3/2006 |
| WO | 2006/137326 | 12/2006 |

OTHER PUBLICATIONS

Wang et al; "Speckle reduction in laser projection systems by diffractive optical elements"; Applied Optics; vol. 37; No. 10; Apr. 1, 1998; p. 1770-1775.

Kasazumi et al; "A practical laser projector with new illumination optics for reduction of speckle noise"; 2004 The Japan Society of Applied Physics; vol. 43, No. 8B, 2004; pp. 5904-5906.

Trisnadi; Hadamard speckle contrast reduction; 2004 Optical Society of America' Jan. 1, 2004, vol. 29, No. 1, Optics Letters; p. 11-13.

Trisnadi; "Speckle contrast reduction in laser projection displays"; Proceedings of SPIE; vol. 4657 (2002), p. 131-137.

Shin et al; "Removal of speckle using a computer generated random phase"; Proceedings of SPIE; vol. 6288; p. 1-7.

\* cited by examiner

SPECKLE MITIGATION IN LASER PROJECTION SYSTEMS

BACKGROUND OF THE INVENTION

1. Field of the Invention

Embodiments of the present disclosure relate to laser projection systems, and, more specifically, to laser projection systems that reduce the appearance of speckle that may be visible in a laser projection image.

2. Technical Background

Speckle may result whenever a coherent light source is used to illuminate a rough surface, for example, a screen, wall, or any other object that produces a diffused reflection or transmission. Particularly, a multitude of small areas of the screen or other reflecting objects scatter light into a multitude of reflected beams with different points of origination and different propagation directions. Speckle causes high spatial frequency noise in the projected image. At an observation point, for example in the eyes of an observer or at the sensor of a camera, these beams interfere constructively to form a bright spot, or destructively to form a dark spot, producing a random granular intensity pattern known as speckle. Speckle may be characterized by grain size and contrast, usually defined as a ratio of standard deviation to mean light intensity in the observation plane. For a large enough illuminated area and a small enough individual scattering point size, the speckle will be "fully developed," with a brightness standard deviation of 100%. If an image is formed on the screen using a coherent light source such as laser beams, such granular structure will represent noise or a serious degradation of the image quality. This noise presents a significant problem, particularly when the projector is used to display high spatial frequency content, such as text.

A general concept of minimizing speckle contrast in an image consists of projecting an intermediate scanned laser image over a small sized diffusing surface, and using projection optics to project that intermediate scanned laser image toward the final projection surface. By rapidly moving the diffuser, the phase of the electric field is scrambled over time, which results in changing the perceived speckle pattern. If the diffuser is moving or vibrating fast enough, the perceived speckle pattern changes at high frequencies and are averaged in time by the eye. To reduce speckle efficiently, multiple speckle frames need to be created over the integration time of the eye, which is typically in the order of 50 Hz.

Although rapidly moving the diffuser provides speckle reduction, it requires expensive and complicated mechanisms to move the phase mask laterally at a relatively high speed. Further, a moving diffuser requires the use of auto-focus mechanisms as well as lenses possessing a high numerical aperture and a high field of view, which adds significant complexity and cost to the system.

BRIEF SUMMARY OF THE INVENTION

According to one embodiment, a laser projection system comprising a light source and scanning optics is provided. The scanning optics include a plurality of frame generating optics configured to scan the output beam across a given projection surface to generate an image frame. The frame generating actuators are spatially separated such that output beams scanned by the frame generating actuators illuminate each common pixel portion of the image frames at a different incidence angle. The scanning optics also include an actuator selector positioned in an optical path of the output beam and configured to direct the output beam towards a selected one of the plurality of frame generating actuators.

According to another embodiment, a method of operating a laser projection system is provided. The method includes operating a light source to emit at least one output beam, and directing the output beam towards a selected one of a plurality of frame generating actuators. The method further includes generating at least a portion of a scanned laser image on a given projection surface by operating the light source for output emission of encoded image data and controlling the selected frame generating actuator to scan the output beam across a plurality of image pixels to define an image frame. The frame generating actuators are spatially separated such that output beams scanned by each frame generating actuator illuminate each common pixel portions of the image frame at a different incidence angle.

According to yet another embodiment, a method of operating a laser projection system including a light source and scanning optics including a plurality of frame generating actuators and an actuator selector is provided. The method includes operating the light source for output emission of encoded image data in the form of at least one output beam and controlling the actuator selector to direct the output beam towards a selected one of the plurality of frame generating actuators. The method further includes controlling the selected frame generating actuator to scan the output beam across a plurality of image pixels to define an image frame, wherein the frame generating actuators are spatially separated such that output beams scanned by the frame generating actuators illuminate common pixel portions of the image frames at a different incidence angle.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
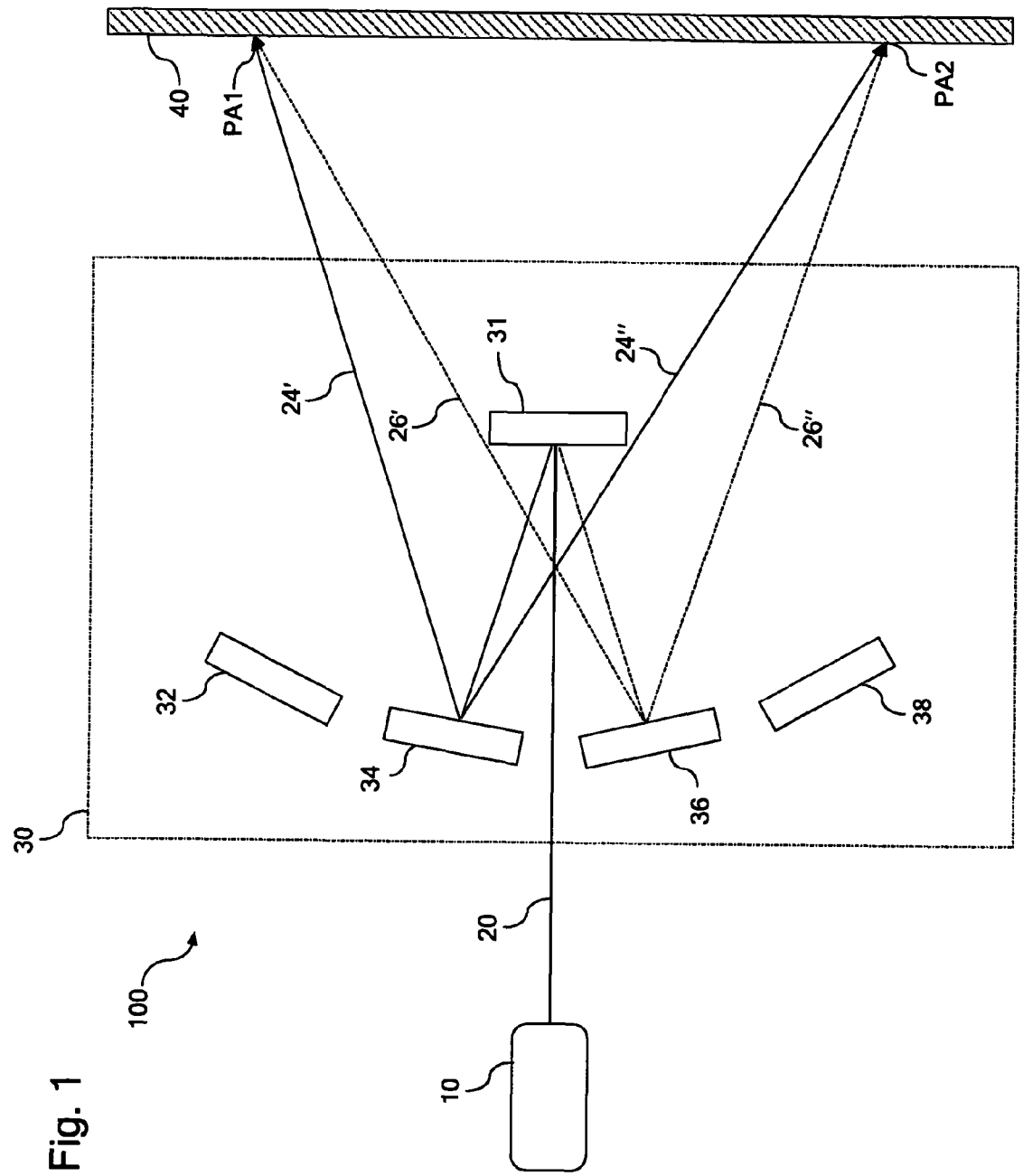
FIG. 1 is a schematic illustration of a top view of an exemplary laser projection system according to one or more embodiments.

Particular embodiments of the present disclosure may be described in the context of a laser projection system that is configured to scan an output signal or beam across a projection surface to generate a two dimensional image. However, embodiments may be implemented in not only laser projection systems, but other optical systems utilizing coherent light sources where the reduction of speckle is desired. The appearance of speckle in the scanned laser image may be reduced by changing the angle of incidence of scanned output beams directed towards common pixel portions of an image frame at a speckle reduction frequency. By changing the angle of incidence of the scanned output beams, different speckle patterns may be created because the light is scattered by the projection surface at different angles. The human eye or sensor then averages the different speckle patterns over time and the appearance of speckle is thereby reduced. Embodiments change the angle of incidence of the output beam upon the projection surface by projecting the scanned laser image from different locations at a speckle reduction frequency, such as at a frame-per-frame basis or at an every other frame basis, for example. Laser projection systems in accordance with the present disclosure do not require the use of moving diffusers, auto-focus mechanisms or high numerical aperture and field of view lenses, although these components may be utilized in conjunction with the embodiments described herein, if desired.

FIGS. 1-4 are schematic illustrations of an exemplary laser projection system 100 according to one or more embodiments. The exemplary laser projection system 100 is configured as a scanning laser projection system that is programmed and configured to two-dimensionally scans an output beam 20 generated by a light source 10 to create a two-dimensional image at a given projection surface 40, such as a wall or a projector screen. The laser projection system 100 may be used to display static images (e.g., text), moving images (e.g., video), or both. The system may be compact such that it may be incorporated into a relatively small device, such as a hand-held projector, cell phone, personal data assistant, notebook computer or other similar devices.

The light source 10 may comprise one or more lasers that are operable to emit coherent beams at different wavelengths. For example, the light source 10 may comprise three lasers capable of emitting beams of red, blue and green wavelengths, respectively. According to some embodiments, the output beam 20 consists of collimated red, green and blue beams. Other embodiments may utilize a light source 10 that emits more or fewer collimated laser beams, and/or beams at wavelengths other than red, blue or green.

The light source 10 may comprise one or more single-wavelength lasers, such as distributed feedback (DFB) lasers, distributed Bragg reflector (DBR) lasers, vertical cavity surface-emitting lasers (VCSEL), vertical external cavity surface-emitting lasers (VECSEL) or Fabry-Perot lasers, for example. Additionally, to generate a green beam, the light source 10 of some embodiments may also comprise a wavelength conversion device such as a second harmonic generating (SHG) crystal or a higher harmonic generating crystal to frequency-double a laser beam having a native wavelength in the infrared band. For example, a SHG crystal, such as an MgO-doped periodically poled lithium niobate (PPLN) crystal, may be used to generate green light by converting the wavelength of a 1060 nm DBR or DFB laser to 530 nm. The light source 10 may also comprise lasers other than single wavelength lasers, such as lasers capable of emission of multiple wavelengths.

The laser projection system 100 may be programmed to perform many of the control functions disclosed herein as well as additional functions. The system 100 may be programmed in numerous ways, including conventional or yet-to-be-developed programming means. Means of programming the system 100 discussed herein are not intended to limit the embodiments to any specific way of programming.

In some embodiments, the laser projection system 100 may include one or more system controllers (not shown), such as microcontrollers, for example, that are programmed to control the light source 10 to generate a single or multi-color image data stream. The system controller, along with image projection software and associated electronics known in the art, may provide the light source with one or more image data signals (e.g., laser drive currents) that carry image data. To create the desired image, the light source 10 may then emit the encoded image data in the form of gain or intensity variations of the output beam 20. However, some embodiments may utilize other controller or programming means to generate the scanned laser image.

Positioned within an optical path of the output beam 20 are scanning optics 30 or a scanning optics package comprising a plurality of frame generating actuators 32, 34, 36 and 38, and one or more actuator selectors 31. Although four frame generating actuators 32-38 are illustrated in the exemplary embodiment of FIG. 1, more or fewer actuators may be utilized. As will be described hereinbelow, components of the scanning optics 30 cooperate to scan and project a plurality of successive image frames from respective positions toward the projection surface 40. Projecting the frames from differing positions changes the average angle of incidence of the frames projected and therefore the appearance of speckle to an observer is mitigated.

The actuator selector 31 may be positioned in an optical pathway of the output beam 20 and configured to direct the output beam 20 toward a selected frame generating actuator 32-38. The actuator selector 31 may comprise a reflective surface such as a mirror in which to reflect the output beam 20. According to other embodiments, the actuator selector 31 may comprise a prism that is capable of redirecting the output beam towards the projection surface 40. Further, the actuator selector 31 may be controllable (e.g., by a system controller or other control electronics) to change the selected frame generating actuator 32-38 upon which the output beam 20 is incident upon. For example, during one frame, the actuator selector 31 may be rotated or moved to direct the output beam 20 toward frame generating actuator 34 and, after a predetermined time (e.g., at the completion of a scanned frame), be rotated or moved to direct the output beam 20 upon frame generating actuator 36. The actuator selector 31 may be controlled to change the selected frame generating actuator 32-38 at any particular frequency. As an example and not by way of limitation, the actuator selector 31 may be controlled to change the selected frame generating actuator 32-38 at the image frame rate (i.e., the rate in which the frame generating actuators 32-38 generate frames as described herein). It is desirable, but not required, to control the actuator selector 31 to change the selected frame generating actuator upon completion of a frame to avoid any disturbances in the frame that is presently being generated.

The actuator selector 31 may be controlled to direct the output beam 20 toward selected frame generating actuators 32-38 in a variety of ways. According to one embodiment, the actuator selector 31 may be controlled to sequentially redirect the output beam 20 toward a frame generating actuator that is adjacent to the frame generating actuator that is presently selected. Sequentially as used herein means in any pattern that is not random. For example, if frame generating actuator 32 is presently selected, the actuator selector 31 may be controlled to redirect the output beam toward frame generating actuator 34 upon completion of the frame scanned by frame generating actuator 32. The actuator selector 31 may then switch to the next frame generating actuator 36 and then to frame generating actuator 38. The actuator selector 31 may be controlled to direct the output beam 20 back and forth across the plurality of frame generating actuators (e.g., 32,34, 36,38,36,34,32, etc.) or in a unitary direction (e.g., 32,34,36, 38, 32,34, 36, 38, etc.). Further, the actuator selector 31 may be controlled to sequentially redirect the output beam 20 in a predetermined selection pattern that is not sequential as described above. The actuator selector 31 may also be controlled to direct the output beam 20 towards selected frame generating actuators 32-38 on a random basis.

The actuator selector 31 illustrated schematically in FIGS. 1-4 may take a variety of conventional or yet to be developed forms. For example, it is contemplated that the drive mechanism of the actuator selector 31 may comprise one or more controllable and movable micro-opto-electromechanical systems (MOEMS) or micro-electro-mechanical system (MEMS) operatively coupled to a mirror. It is also contemplated that the MOEMS or MEMS be operatively coupled to a prism that is configured to redirect the output beam toward the projection surface 40. The MOEMS or MEMS devices may be positioned and controlled redirect the output beam 20 in an x and/or y direction toward a selected frame generating actuator 32-38 as described hereinabove. The actuator selector 31 may be controlled via a drive signal provided by a system controller, for example.

Each of the exemplary frame generating actuators 32-38 illustrated in FIG. 1 may be configured to receive the output beam 20 from the actuator selector 31 and two dimensionally scan a plurality of pixels defining an image frame. The image data signal may be provided by the system controller or other electronics to vary the intensity or gain of the output beam or beams 20 corresponding to the particular pixels within the generated frames.

The drive mechanisms of the frame generating actuators may comprise one or more controllable and movable MEMS or MOEMS coupled to a mirror or prism. Adjustment of the mirror or prism angle will result in a change in the x/y position of a projected beam spot at the projection surface 40. The output beam 20 may be scanned across a plurality of pixels and lines, thereby generating an image frame at the projection surface 40. The frame generating actuators 32-38 may be capable of generating a plurality of successive frames at a frame rate that is not detectable by the human eye or a sensor (e.g., the integration time of the human eye), such as 50 Hz, for example. However, it is contemplated that the frames may be generated at rates other than 50 Hz.

The frame generating actuators 32-38 may be controlled individually or together as a group to scan the output beam 20 to generate image frames. Embodiments wherein the frame generating actuators 32-38 are controlled individually, only the selected frame generating actuator (i.e., the frame generating actuator 31 upon which the actuator selector is presently directing the output beam 20) is controlled or actuated to scan the output beam 20 onto the projection surface 40. However, in embodiments wherein the plurality of frame generating actuators 32-38 are controlled as a group, a single scanning control signal is supplied to all of the frame generating actuators 32-38 such that the actuators scan and move simultaneously. Although all of the frame generating actuators 32-38 scan simultaneously according to this embodiment, only the selected frame generating actuator scans and projects the output beam 20 toward the projection surface 40. The laser projection system 100 may be programmed to control the frame generating actuators 32-38 via a control signal or signals provided by a system controller or other control electronics.

Figure 2:
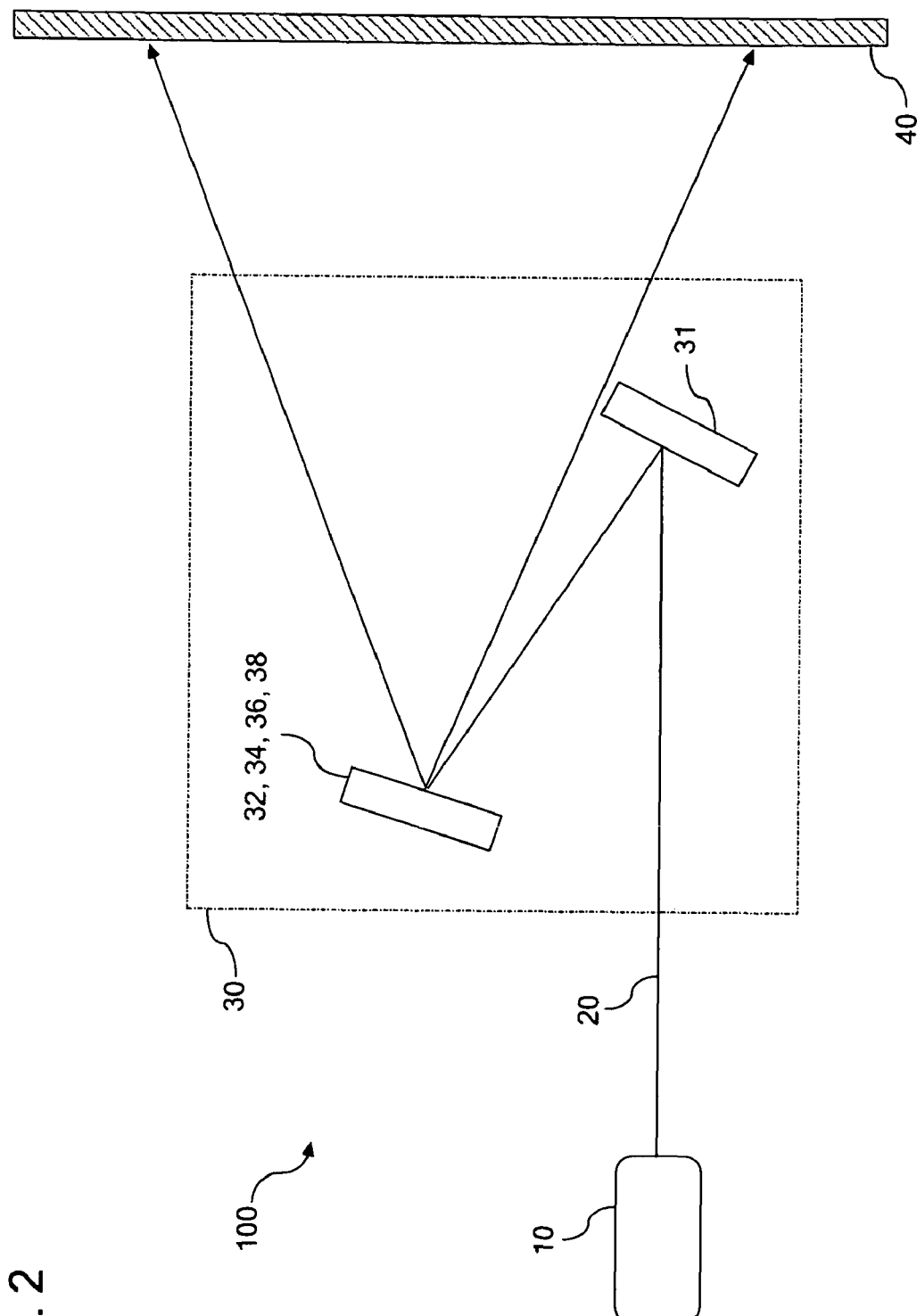
FIG. 2 is a schematic illustration of a side view of an exemplary laser projection system according to one or more embodiments.
Figure 3:
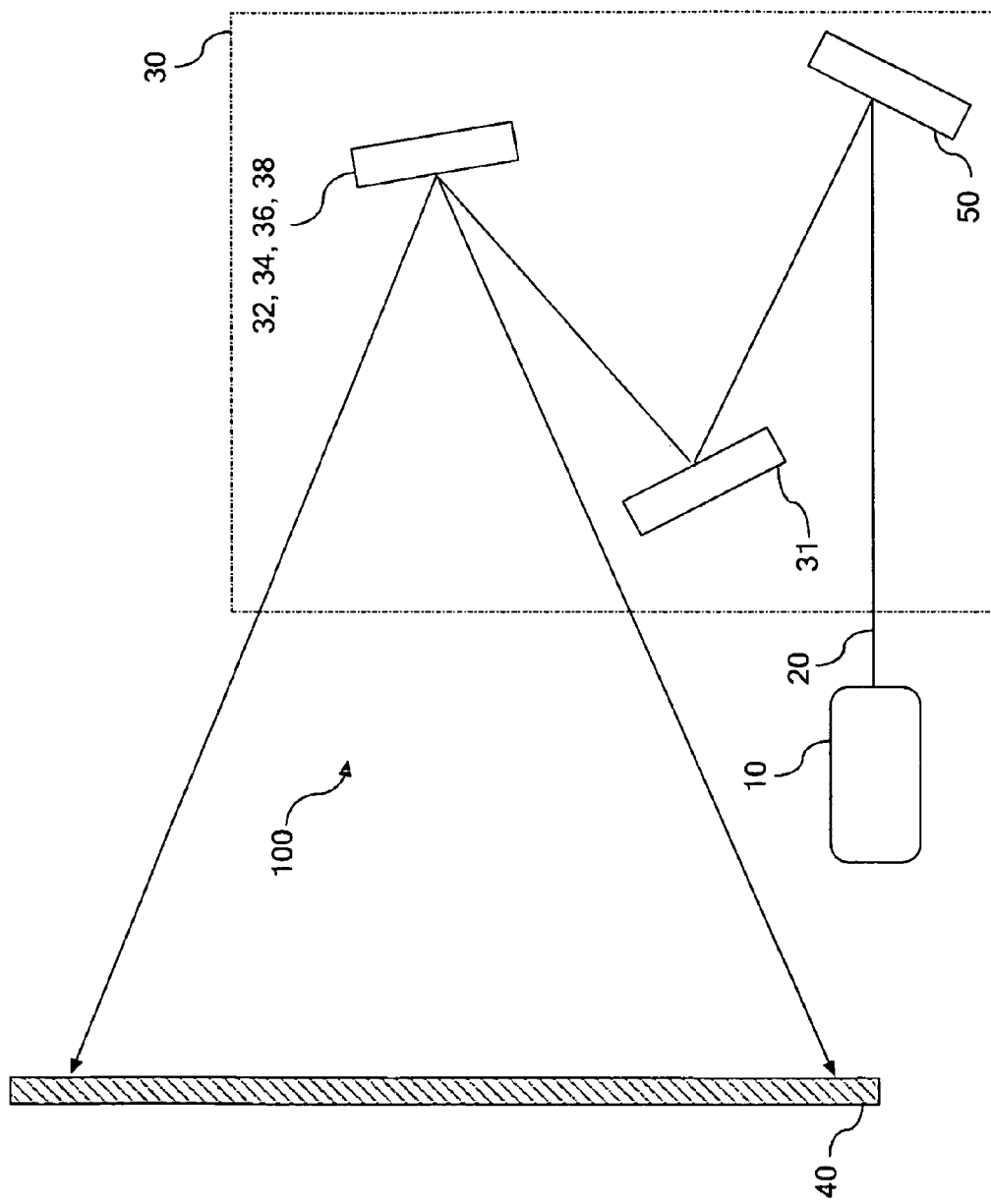
FIG. 3 is a schematic illustration of a side view of an exemplary laser projection system according to one or more embodiments.
Figure 4:
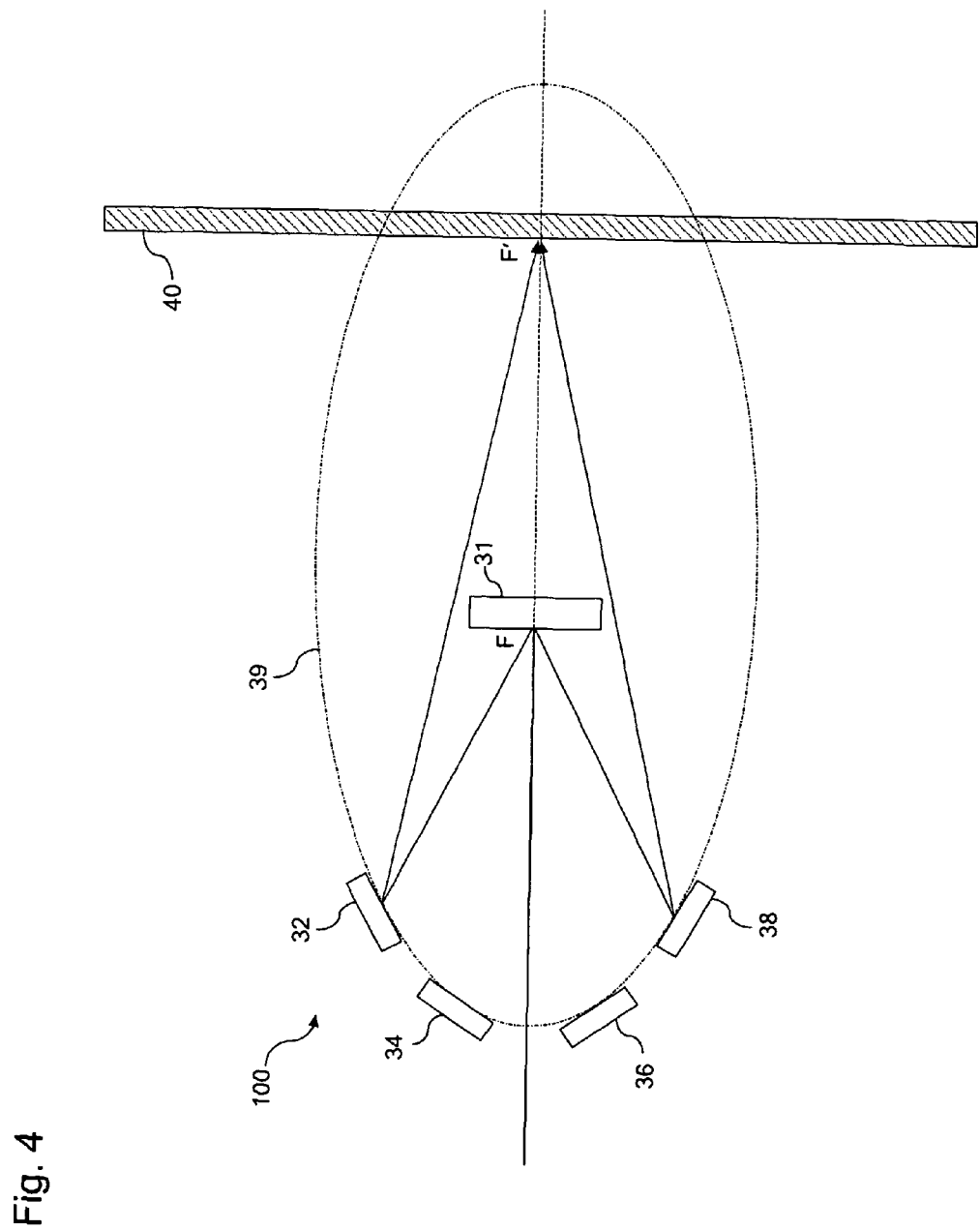
FIG. 4 is a schematic illustration of a top view of an exemplary laser projection system according to one or more embodiments.

The plurality of frame generating actuators 32-38 are positioned to scan and direct the output beam 20 towards the projection surface 40 from different scanning locations. For example, in the exemplary embodiment illustrated in FIG. 1, the frame generating actuators 32-38 are spatially and symmetrically arranged about the optical path of the output beam 20 as viewed from the top of the laser projection system 100. Although FIG. 1 illustrates an actuate and symmetrical arrangement of the plurality of frame generating actuators 32-38, such an arrangement is not required and other arrangements are possible. Additionally, FIGS. 2 and 3 illustrate a side view of exemplary laser projection systems 100 in which the plurality of frame generating actuators 32-38 are positioned in a plane located above the optical path of the output beam 20. It is contemplated that the frame generating actuators 32-38 may be positioned in a plane located below or within the plane in which the optical path of the output beam 20 is located.

The frame generating actuators 32-38 are also angled and configured to project the output beam 20 towards common pixel portions of the image frames at the projection surface such that same pixel of each frame is projected upon the projection surface 40 at the same location as successive frames are generated. To ensure the projection of a stable image substantially free of distortion, each pixel of the scanned laser image may be projected upon a respective common pixel portion regardless of which frame generating actuator 32-38 scans the output beam 20. In other words, each of the frame generating actuators 32-38 have a scanning angle such that a pixel may be projected upon the projection surface 40 at substantially the same location for each frame. FIG. 1 illustrates an output beam 20 that is scanned by frame generating actuators 34 and 36. As an example, the output beams 24' and 26' may carry optical data for a particular pixel $P_{x,y}$ within the image frame and are scanned by actuators 34 and 36. Both beams 24' and 26' converge at the same common pixel portion A1 at the projection surface. Similarly, the output beams 24" and 26" may carry optical data for pixel $P_{x',y'}$ both converge at common pixel portion A2. Scanned output beams corresponding to the plurality of pixels of each frame converge at substantially the same respective common pixel portion.

As illustrated in FIG. 1 and described hereinabove, the frame generating actuators 32-38 are oriented such that each frame generating actuator directs an output beam (e.g., 24' and 26', 24" and 26") toward a common pixel portion (e.g., A1 or A2) from a distinct and different angle of incidence. In other words, the scanning optics 30 may be designed and arranged in such a way that, when all the frame generating actuators 32-38 are set at the same angle (e.g., at the middle of their angular deflection range) the output beam 20 may be projected upon the projection surface 40 at approximately the same location for all angular positions of the actuator selector 31. Referring to the embodiment illustrated in FIG. 4, this condition may be achieved by positioning the frame generating actuators 32-38 along a parabolic curve 39, where the actuator selector 31 is located at one focus F of the parabola 39 and the projection surface 40 is located at the other focus F' of the parabola 39. The frame generating actuators may be coupled to a parabolic structure to effectuate the parabolic arrangement illustrated by the parabolic curve 39.

Referring once again to FIG. 1, exemplary beam 24' directed by frame generating actuator 34 is incident upon common pixel portion A1 at an angle of incidence that is different than exemplary beam 26' directed by frame generating actuator 36. Because the exemplary output beams 24' and 26' are incident upon the projection surface 40 at different angles, two different speckle patterns are created. In the laser projection system 100 depicted in FIG. 1, each common pixel portion may be illuminated by four different output beams at four different angles of incidence. The overall effect is that a unique speckle pattern is produced by each frame generating actuator 32-38 as the output beam 20 is scanned across the projection surface 40. By controlling the actuator selector 31 to change which frame generating actuator 32-38 is used to scan the image at a speckle reduction frequency, different speckle patterns may be rapidly created. The eyes of an observer or a sensor averages the rapidly changing different speckle patterns such that the appearance of speckle patterns is reduced.

Some embodiments of the present disclosure may change the scanning angle of some or all of the frame generating actuators 32-38 based on the distance D of the laser projection system 100 from the projection surface 40 to ensure that the scanned output beams (e.g., 24' and 26', 24" and 26") are substantially directed towards the proper common pixel portions. As the laser projection system 100 is moved closer to or further away from the projection surface 40, the scanned output beams may no longer converge at the proper common pixel portions, which may result in a distorted image. Accordingly, the scanning angle of each or some of the frame generating actuators 32-38 may be adjusted such that the scanned output beams converge at the proper common pixel portions. In one embodiment, the laser projection system 100 may automatically detect the distance D from the projection surface 40 and adjust the scanning angle of the frame generating actuators 32-38. Another embodiment may prompt a user to enter an approximate distance D of the laser projection system 100 to the projection surface 40 and adjust the scanning angle of the frame generating actuators 32-38 based on the user-entered distance D.

Although the light source 10 and scanning optics 30 are illustrated in FIGS. 1 and 2 as effectuating an optical pathway in which the scanned output beams are projected the same or similar direction as output beam 20, it is noted that other optical pathway configurations are also possible. For example, as illustrated in FIG. 3, the direction of the scanned output beams may be opposite the direction of the output beam 20 such that the scanned output beams are directed back towards the light source 10. According to the illustrated exemplary embodiment, an intermediate reflective surface 50 may direct the output beam 20 towards an actuator selector 31, which then directs the output beam 20 towards a selected frame generating actuator 32-38 as described hereinabove. It is contemplated that other configurations are also possible.

For the purposes of describing and defining embodiments of the present disclosure it is noted that the term "substantially" is utilized to represent the inherent degree of uncertainty that may be attributed to any quantitative comparison, value, measurement, or other representation.

It is noted that recitations herein of a component of a particular embodiment being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A laser projection system comprising a light source and scanning optics wherein:

the scanning optics comprises a plurality of frame generating actuators and an actuator selector;

the light source comprises at least one laser configured to emit an output beam;

the actuator selector is positioned in an optical path of the output beam and configured to direct the output beam towards a selected one of the plurality of frame generating actuators;

each of the frame generating actuators is configured to scan the output beam across a given projection surface to generate an image frame; and the frame generating actuators are spatially separated such that output beams scanned by the frame generating actuators illuminate each common pixel portion of the image frames at a different incidence angle.

2. A laser projection system as claimed in claim 1 wherein the laser projection system is programmed to:

generate at least a portion of a scanned laser image on the projection surface by operating the at least one laser for output emission of encoded image data and controlling a selected frame generating actuator to scan the output beam across a plurality of image pixels to define the image frame; and control the actuator selector to direct the output beam to the selected frame generating actuators to change the incidence angle for the output beams as directed towards the common pixel portions of the generated image frames.

3. A laser projection system as claimed in claim 2 wherein the laser projection system is further programmed to adjust a scanning angle of the frame generating actuators for a distance D from the laser projection system to the given projection surface such that the output beams directed by the frame generating actuators are directed towards the common pixel portions of the generated image frames.

4. A laser projection system as claimed in claim 2 wherein the image frames are generated at a frame rate and the laser projection system is programmed to direct the output beam towards the selected frame generating actuators at the image frame rate.

5. A laser projection system as claimed in claim 2 wherein the laser projection system is further programmed to control the actuator selector to direct the output beam towards the frame generating actuators on a random or sequential basis.

6. A laser projection system as claimed in claim 1 wherein the actuator selector directs the output beam towards the selected frame generating actuators by rotating about a rotational axis such that the output beam propagating along an optical path from the light source to the actuator selector is reflected by the actuator selector toward the selected frame generating actuator.

7. A laser projection system as claimed in claim 1 wherein the actuator selector comprises at least one controllable MEMS mirror or at least one controllable MEMS prism.

8. A laser projection system as claimed in claim 1 wherein the plurality frame generating actuators are arranged along a parabolic surface and the actuator selector is located proximate a focus of the parabolic surface.

9. A laser projection system as claimed in claim 1 wherein the plurality of frame generating actuators are controllable MEMS mirrors, controllable MEMS prisms, or combinations thereof.

10. A laser projection system as claimed in claim 1 wherein the frame generating actuators are separated by at least 2 mm.

11. A method of operating a laser projection system comprising:
operating a light source to emit at least one output beam;
directing the output beam towards a selected one of a plurality of frame generating actuators; and
generating at least a portion of a scanned laser image on the given projection surface by operating the light source for output emission of encoded image data and controlling the selected frame generating actuator to scan the output beam across a plurality of image pixels to define the image frame, wherein the frame generating actuators are spatially separated such that output beams scanned by the frame generating actuators illuminate each common pixel portion of the image frames at a different incidence angle.

12. A method as claimed in claim 11 wherein the different incidence angles for the output beams as directed towards the common pixel portions of the generated image frames are changed by directing the output beam towards the selected frame generating actuators.

13. A method as claimed in claim 11 wherein the image frames are generated at a frame rate and the output beam is directed towards the selected frame generating actuators at the image frame rate.

14. A method as claimed in claim 11 further comprising:
determining a distance D from the laser projection system to the give projection surface; and
adjusting a scanning angle of each of the frame generating actuators for the distance D from the laser projection system to the given projection surface such that the output beams directed by the frame generating actuators are directed towards the common pixel portions of the generated image frames.

15. A method as claimed in claim 11 further comprising controlling an actuator selector to direct the output beam towards the selected frame generating actuators.

16. A method as claimed in claim 15 wherein the laser projection system is further programmed to control the actuator selector to direct the output beam towards the frame generating actuators on a random or sequential basis.

17. A method of operating a laser projection system comprising a light source and scanning optics comprising a plurality of frame generating actuators and an actuator selector, the method comprising:
operating the light source for output emission of encoded image data in the form of at least one output beam;
controlling the actuator selector to direct the output beam towards a selected one of the plurality of frame generating actuators; and
controlling the selected frame generating actuator to scan the output beam across a plurality of image pixels to define an image frame, wherein the frame generating actuators are spatially separated such that output beams scanned by the frame generating actuators illuminate each common pixel portion of the image frames at a different incidence angle.

18. A method as claimed in claim 17 wherein the different incidence angles for the output beams as directed towards the common pixel portions of the generated image frames are changed by directing the output beam towards the selected frame generating actuators.

19. A method as claimed in claim 17 wherein the image frames are generated at a frame rate and the actuator is controlled to direct output beam to the selected frame generating actuators at the image frame rate.

20. A method as claimed in claim 17 wherein the laser projection system is further programmed to control the actuator selector to direct the output beam towards the frame generating actuators on a random or sequential basis.

* * * * *